June 10, 1947.　　J. E. UNDERWOOD　　2,421,916
ORIENTING WORK FEEDER
Filed Feb. 9, 1945　　4 Sheets-Sheet 1

INVENTOR.
James E. Underwood
BY
ATTORNEY

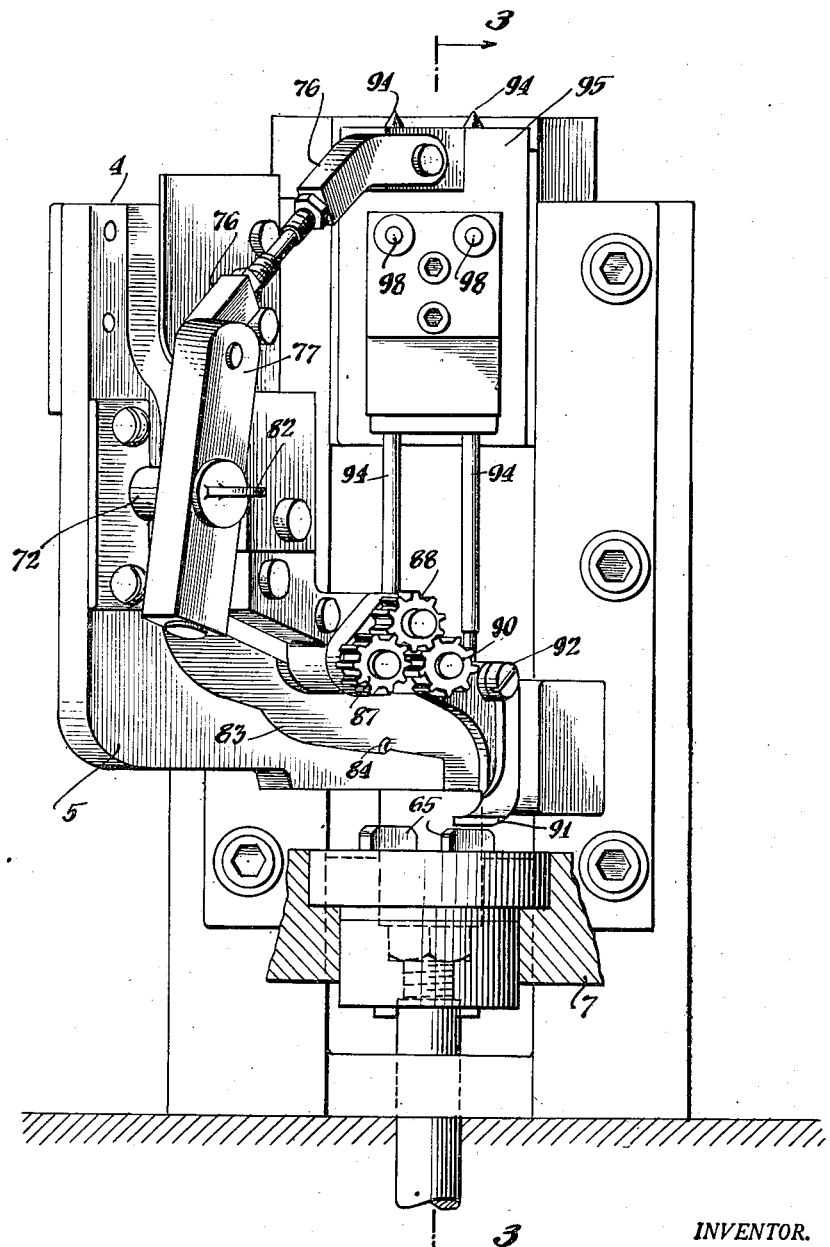

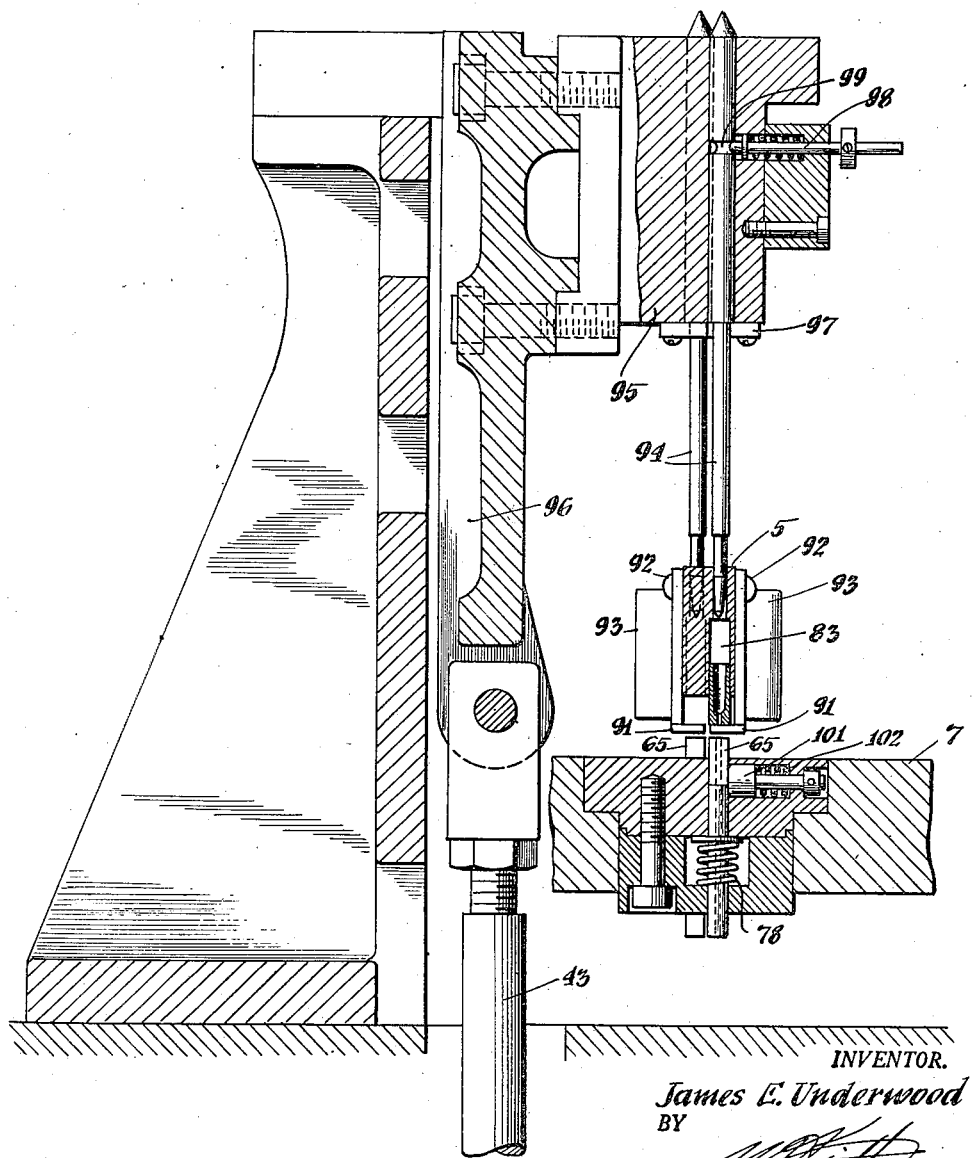

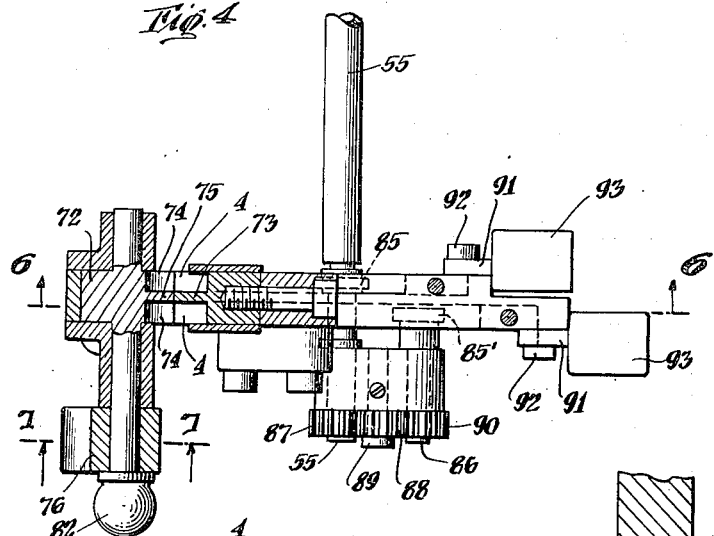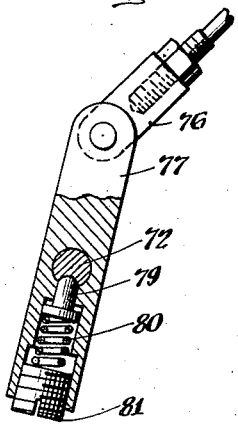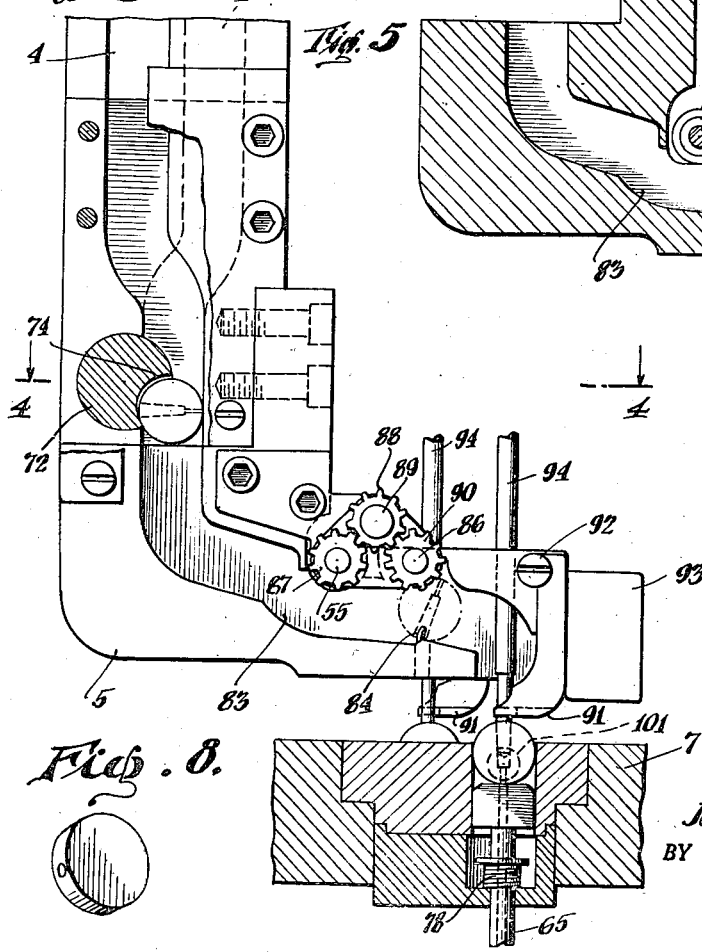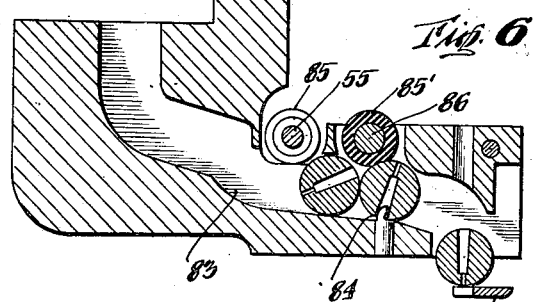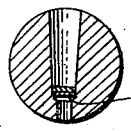
INVENTOR.
James E. Underwood
BY
ATTORNEY Patented June 10, 1947

2,421,916

UNITED STATES PATENT OFFICE 2,421,916

ORIENTING WORK FEEDER

James Ellis Underwood, Oakmont, Pa., assignor to Aluminum Company of America, Pittsburgh, Pa., a corporation of Pennsylvania Application February 9, 1945, Serial No. 576,980

5 Claims. (Cl. 193—43)

This invention relates to improvements in machines of the class adapted to assemble a wafer, washer, or other shape made of relatively thin or pliable material with a receiving member.

The problems to which this invention is specifically directed are connected with the accurate and rapid assembly of the thin metal wafers with a rotor such as is employed in an artillery shell. The principal object of the invention is to provide, in connection with a machine for handling such an object, an improved article handling system adapted to present to a work station from an unoriented mass of rotatable articles, a flow of said articles each in a predetermined oriented position. Other and further objects will appear in the following description of a machine shown in the drawings which embodies, in preferred form and for the purpose stated, the principles of this invention. While illustrated and described with reference to the specific problems first mentioned, the principles of the invention are useful in, and may be applied with equal facility to, the assembly with another article of a shape composed of a thin, pliable or difficultly handled material.

In the drawings:

Fig. 2 is an elevational view, with some part shown in section, of the feeding and orienting device shown in Fig. 1, together with associated portions of the machine assembly in which it is positioned;

Fig. 3 is a vertical section of the device shown in Fig. 2, taken on the line 3—3 as indicated in Fig. 2;

Fig. 4 is a view, partially in section, of the lower portion of the device as indicated by line 4—4 in Fig. 5;

Fig. 5 is a view, partially in elevation and partially in vertical section, of the feed chute and associated elements;

Fig. 6 is a vertical section through the feed chute taken on the line 6—6 indicated in Fig. 4;

Fig. 7 is a view, partially in elevation and partially in cross section, of a portion of a link used to operatively connect certain parts of the feed chute and the transfer rods 94;

Fig. 8 is a perspective view of a rotor typical of the elements which the illustrated machine is designed to handle;

Fig. 9 shows, in partial perspective and section, a foil wafer of a type inserted by the said machine in the aperture of the rotor; and Fig. 10 is a section in enlarged scale through an assembly of the rotor and wafer shown respectively in Figs. 8 and 9.

Figure 1:
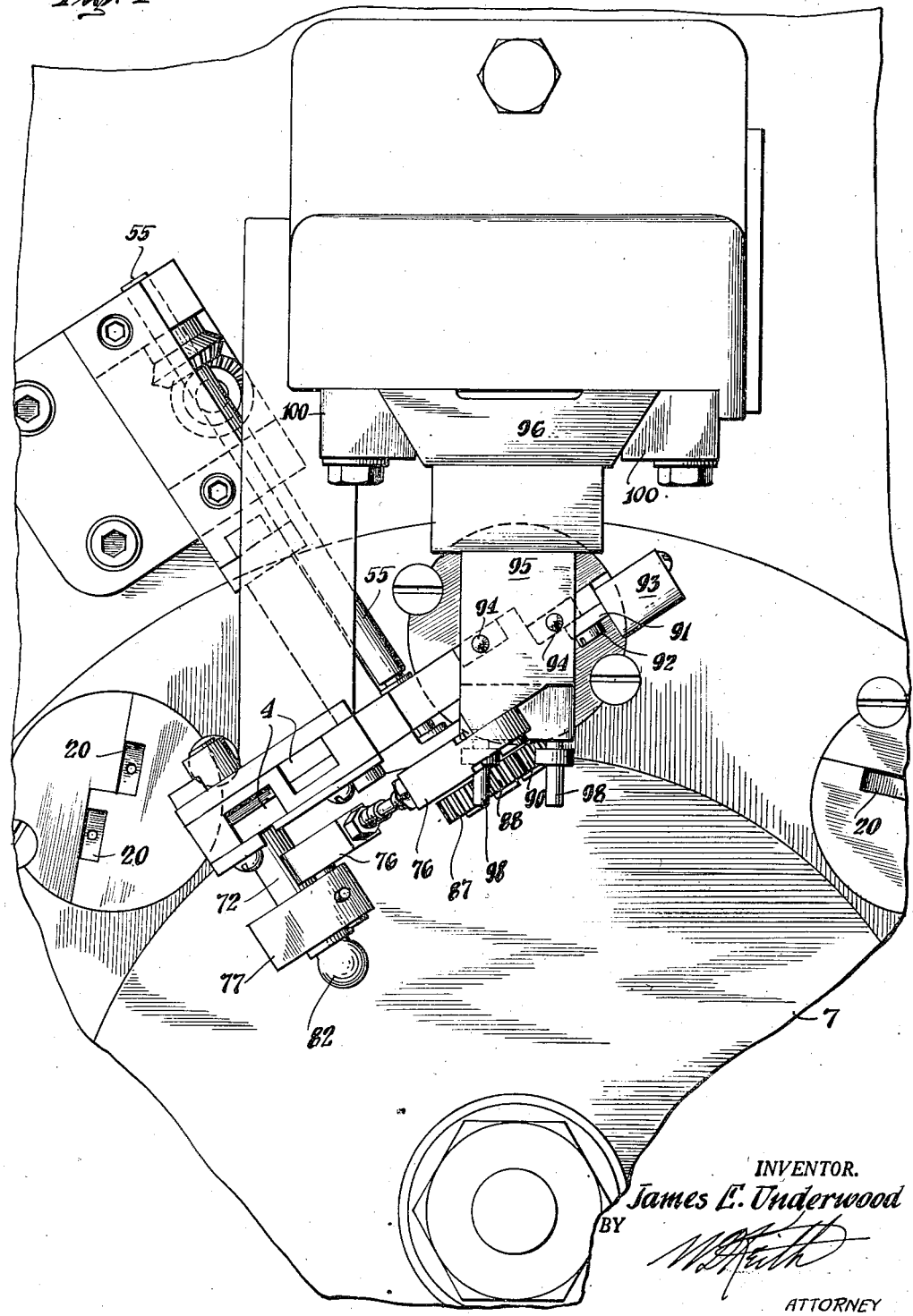
Fig. 1 is a top plan view of a feeding and orienting device embodying the principles of this invention, said device being shown as positioned at a work station in a work assembling machine.

In the drawings the feeding and orienting device which embodies the principle of this invention is shown as a part of a machine assembly designed to assemble the rotor, shown in Fig. 8, with the foil wafer, shown in Fig. 9, which wafer is coated with a dry adhesive coating 66. As assembled, the rotor and wafer take the form indicated in Fig. 10, the wafer being seated in the aperture of the rotor, with its adhesive coated surface resting on shoulder 67 formed in said aperture. As shown, the feeding and orienting device is located in the machine at a work station so that at given intervals, predetermined by the timing of the machine assembly of which it is a part, the transfer rods 94 will operate to deliver oriented rotors from the orienting device into slots 20 located at stations on the turret 7. By means not shown in the drawings turret slots 20 are from time to time indexed to the work station, and at predetermined intervals transfer fingers 94 operate to force oriented rotors from the orienting device into said slots. The feeding and orienting device which embodies the principle of this invention comprises chutes 4 which lead into the orienting device 5. A conventional hopper or other rotor delivery means may be provided to initially deliver unoriented rotors to the top of chutes 4. Two such chutes 4 are used in the machine here illustrated, and it will be noted that for a short distance just before these chutes register with passageways 83 in the orienting device 5 the chutes run parallel to each other (see Figs. 4 and 5) and are separated by the wall 73.

At a point in this parallel run of the chutes 4 there is located a timed release means which here takes the form of pin 72. The release pin is rotatably mounted in the chute structure so that a part of its circumference extends into each of the parallel chutes 4 and normally forms an abutment or means by which the gravity flow of the rotors through the chutes is terminated. The release pin 72 is provided along its surface with the grooves or recesses 74, which are shaped to receive a rotor and pass it through the part of the chute 4 which is normally blocked by the pin. The release pin recesses 74 are separated by a wall 75 which registers with wall 73 between the chutes 4 (see Fig. 4). The release pin 72 is rotated back and forth, to alternately present its recesses 74 to the rotors in the chutes 4. This rotation is achieved by linkage 76 which translates the reciprocating action of the transfer pins 94 to a lever 77 fixed to an extension of the release pin 72. Operative connection between lever 77 and release pin 72 is maintained by the spring loaded pin 79 (see Fig. 7). The spring 80 is adjusted in tension by screw 81 to immediately yield and allow the pin 79 to retract and sever the connection between lever 77 and pin 72 if a rotor becomes jammed between the release pin and the walls of the chute 4. Handle 82 on the end of release pin 72 provides means by which the pin may be rotated if a rotor becomes jammed between the pin and the walls of chute 4.

The rotors are released from the parallel chutes 4, by the described action of release means 72, into the passageways 83 of the orienting device 5. The function of the orienting device is to so orient the rotors in the passages 83 that the rotors when delivered to turret slots 20 will lie in those slots with their apertures in predetermined position, such position being, in the device here shown, with the axis of the rotor aperture at 90° to the surface of the turret 7 and with the larger end of the aperture presented upwardly. To this end each passageway 83 is provided at a point on its floor with the locating means or nipple 84 which is of such size that it will not enter the smaller opening in the circumference of the rotor but will enter the larger opening. A means of rotating each of the rotors in the passages 83 is placed near each such locating nipple so that as the rotor moves through the passage and contacts the nipple it will be rotated on its circumference until the larger opening in its circumference registers with the nipple 84 which then allows the rotor to pass thereover and continue through the passage. The rotating means herein shown are the rubber wheels 85, 85' located so that their circumference extends slightly into the passages 83. Rubber wheel 85' is fixed on rotatable shaft 86 which shaft is rotated through the gear train composed of gear 87 fixed on shaft 55, gear 88 mounted for rotation on fixed shaft 89 and gear 90 fixed on shaft 86.

Locating nipple 84 is positioned a predetermined distance from the delivery end of a passage 83 so that a rotor once oriented by the nipple will turn on its circumference a predetermined amount before dropping from the end of the passage. In the machine illustrated the predetermined distance chosen is one-half of the circumference of the rotor thereby insuring that as the rotor falls from the passage 83 the large opening in the circumference which previously registered with nipple 84 will be presented upwardly. The rotors having registered with nipple 84 pass beyond that nipple through the passage and fall therefrom upon the elements 91 positioned directly below the end of said passages. Each element 91 is, in effect, a swinging finger pivoted on an axle 92 for movement outwardly from below the passage opening, the weight 93 attached to each element tending to normally place the element below the passage opening.

The rotor now positioned on the element 91 is thus held in place awaiting the action of the transfer fingers 94 which comprise means for transferring the oriented rotor from the orienting device to a position in the turret 7 in the slots 20 while maintaining the oriented position of the rotor. This is accomplished by transfer rods 94 mounted in a structure 95 which is carried on slide 96. Slide 96 is mounted on the machine frame in ways 100 for reciprocatory movement toward and away from turret 7, this movement being imparted through linkage 43. Referring to Fig. 3, the transfer rods 94 have an enlarged end slidably mounted on structure 95, the rods being retained in that structure by keeper plate 97 and the spring loaded retractible pins 98 which enter a groove 99 cut circumferentially in each of the rods. Under normal operating conditions the rods 94 are retained on structure 95 in the position shown in Fig. 3 but unusual pressures exerted on the operating ends of the rods as a result of improper orientation of a rotor will cause pins 98 to retract against the action of their springs releasing the rods and allowing them to move upwardly out of the operating position.

As the transfer slide 96 moves downwardly, the transfer pins 94 enter the apertures in the rotors now held on the elements 91, and force the rotors downwardly. This action places pressure on elements 91 causing them to swing on their pivots 92 and thus allowing each rotor to be brought against the head of each knockout pin 65 forcing that pin downwardly against the action of its spring 78, and thus allowing the successive rotors to be seated in the turret slots 20. Thereafter slide 96 is moved upwardly retracting the transfer pins 94 and allowing elements 91 to swing back into position to receive the next rotors delivered from the lower end of the passages 83. To insure that the rotors will remain properly seated in the turret slots 20 during withdrawal of transfer pins 94, and that rotors will not become unseated or moved during succeeding operations, there is provided in the turret, adjacent each turret slot, the spring loaded plunger 101, the head of each such plunger forming part of one side wall of a turret slot. Spring 102 tends to force each plunger outwardly against the knockout pin 65. When the knockout pin 65 is forced downwardly by the action of transfer pin 94, to allow a rotor to enter the turret slot 20, the plunger 101 contacts one side of the rotor and thereby furnishes means for maintaining the rotor in the slot against accidental displacement or displacement by reason of the withdrawal of the transfer pins.

It will be apparent that the device just described includes a structure defining a confined passageway adapted to receive the rotatable body, an abutment positioned in the passageway to interrupt the passage of an unoriented rotatable body, and means positioned at this point of interruption to rotate the unoriented body against the abutment to register the opening in said body with the abutment. This abutment, here shown as the locating pin 84, is so positioned and sized as to fit within the body opening so that during the rotation of the rotatable body against the abutment the registering of the opening in the surface of that body with the abutment will cause the rotatable body to pass over the abutment in an oriented position. That portion of the passageway floor which lies between the abutment and the delivery opening of the passageway is therefore, of such predetermined length that a rotatable body rolling thereupon will be delivered at the end of the passageway in a predetermined oriented position measured by the amount of rotation of the body from the time that it passed over the abutment or orienting point. It will further be noted that if the operation were of such nature that the rotatable body could be dropped from the open passageway immediately into a device which would hold it in an oriented position for further operation, there would be no necessity for the transfer device which operates at the lower end of the passage or for the pressure displaceable fingers 91 which normally close the end of the passage. However, in the device herein specifically described where it is necessary that the rotatable bodies once coming to the end of the orienting passageway become seated in the turret by force, it is convenient to provide at the end of the passageway, the pressure displaceable elements 91 or other pressure displaceable means and to provide transfer mechanisms by which the bodies, while still maintained in their oriented positions, may be moved past the pressure displaceable means into their seats in the work translating device. It will also be apparent that the orienting device of this invention may be used in connection with any rotatable body whether or not the assembly of said body with another element is a succeeding step.

In view of this and other equally apparent variations it will be understood that the specific mechanism in which the principles of this invention are embodied is but illustrative and that such illustration has been given without the intent to restrict the invention in form except as the same is expressed in the appended claims.

I claim:

1. In a device for feeding to a work station in oriented position a rotatable body having an opening in its surface, a structure defining a confined passageway adapted to receive said body, an abutment positioned in said passageway to interrupt the passage of an unoriented body, said abutment being positioned and sized to fit within said body opening, and means positioned to rotate the surface of said body against said abutment to register said body opening with said abutment.

2. In a device for feeding to a work station in oriented position a rotatable body having openings of different sizes in its surface, a structure defining a confined passageway adapted to receive said body, an abutment positioned in said passageway to interrupt the passage of an unoriented body, said abutment being positioned and sized to fit within a selected opening in said body, and means positioned to rotate said body against said abutment to register the selected opening with the abutment.

3. In a device for feeding and orienting a rotatable body having an opening in its surface, a structure defining a confined passageway including a floor on which said body travels, a chute connecting a source of rotatable bodies with said passageway, means located in said chute to feed said bodies to said passageway at predetermined intervals, an abutment positioned intermediate said passageway for interruption of the travel of an unoriented body therethrough, said abutment being positioned and sized to fit within the opening in said body, means positioned to rotate said body against said abutment to register the opening thereof with the abutment, said abutment being positioned a predetermined distance from the delivery end of said passageway whereby an oriented body having passed said abutment will roll over a floor of predetermined length.

4. In a device for orienting and feeding to a work station a disc-like rotatable body having an opening disposed in its circumferential surface, a structure defining a downwardly sloping passageway of a size to permit the gravity movement therethrough of said rotatable body, means for feeding said bodies to the upper end of said passageway at predetermined intervals, an abutment disposed on the floor of said passageway intermediate the ends thereof to interrupt the travel of unoriented bodies therethrough, said abutment being sized to pass within an opening in said body, and means for rotating the surface of said body against the abutment to register said opening therewith.

5. In a device for orienting and feeding to a work station a disc-like rotatable body having an opening disposed in its circumferential surface, a structure defining a downwardly sloping passageway sized to permit the gravity movement therethrough of said rotatable body, means for feeding said bodies to the upper end of said passageway at predetermined intervals, pressure displaceable means disposed to normally prevent escape of said bodies from the lower end of said passageway, an abutment disposed on the floor of said passage intermediate the ends thereof to interrupt the travel of unoriented bodies therethrough, said abutment being sized to pass within an opening in said body, means for rotating the said body against the abutment to register said opening therewith, and means operating in said passage at its lower end to periodically force oriented bodies to pass said pressure displaceable means while maintaining said bodies in oriented position.

JAMES ELLIS UNDERWOOD.

REFERENCES CITED

The following references are of record in the file of this patent:

UNITED STATES PATENTS

| Number | Name | Date |
| --- | --- | --- |
| 340,234 | Meigs | Apr. 20, 1886 |